UNITED STATES PATENT OFFICE 1,931,836

WATER SOLUBLE AZODYESTUFFS

Rudolf Bauer, Cologne-Deutz, Germany, assignor to General Aniline Works, Inc., New York, N. Y., a corporation of Delaware No Drawing. Application February 1, 1932, Serial No. 590,314, and in Germany February 9, 1931

12 Claims. (Cl. 260—78)

The present invention relates to a process of preparing water soluble azodyestuffs and to the products obtained thereby, more particularly it relates to disazodyestuffs which may be represented by the probable general formula:

$$(R_1-N=N-x-N=N-R_1-)_j-SO_3H,$$

wherein $x$ represents a diphenyl- or diphenylurea dicarboxylic acid radical, one $R_1$ represents the radical of an acetoacetic arylamide and the other $R_1$ represents a pyrazolone radical, the sulfonic acid group probably standing in the aromatic nucleus of the acetoacetic arylamide radical.

The new water soluble azodyestuffs of the above general formula are prepared by starting with an azodyestuff of the general formula:

$$R_1-N=N-x-N=N-R_1,$$

wherein the figures $x$ and $R_1$ mean the same as stated above, and sulfonating the same with one of the usual sulfonating agents, such as sulfuric acid monohydrate, sulfuric acid containing sulfuric anhydride, chlorosulfonic acid, and the like, until a test portion has become soluble in aqueous alkalies.

The starting disazodyestuffs can be prepared in the usual manner by tetrazotizing a 4.4'-diaminodiphenyl-3.3'- dicarboxylic acid or a 4.4'-diaminodiphenylurea-3.3'-dicarboxylic acid and coupling in any course of succession with one molecular proportion of an acetoacetic arylamide and one molecular proportion of a pyrazolone.

As coupling components there may be mentioned by way of example acetoacetic anilide, acetoacetic-o-chloroanilide, acetoacetic anisidide, acetoacetic-α-naphthylamide, methylphenylpyrazolone, aminophenylmethylpyrazolone and substitution products thereof.

My new sulfonated dyestuffs are in the form of their alkali metal salts water soluble yellowish to brownish powders, dyeing the cellulosic fibre generally yellow to brown shades, which, by the after-treatment with copper salts, yield full and clear dyeings of good fastness to light and washing.

The invention is illustrated by the following examples, without being limited thereto:

*Example 1.*—200 parts by weight of the disazodyestuff obtainable from one molecule of 4.4'-diaminodiphenylurea-3.3'-dicarboxylic acid, one molecule of acetoacetic-o-anisidide and one molecule of m-aminophenylmethylpyrazolone are introduced at +5° C. into 2,000 parts by weight of sulfuric acid monohydrate. When a test portion of the dyestuff has become soluble in sodium carbonate, the sulfonation mixture is poured into 10,000 parts of ice water and the dyestuff, which separates, is filtered. The dyestuff having in its free state the following probable formula:

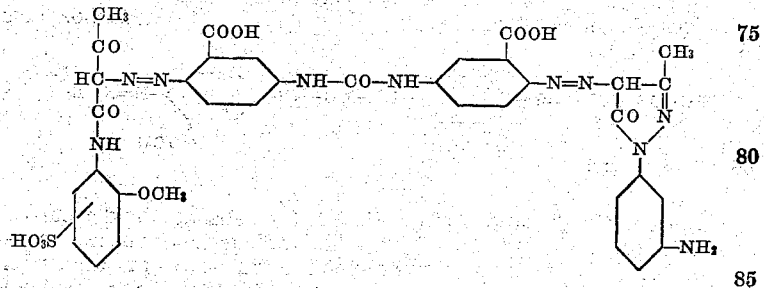

is stirred with sodium carbonate solution and dried. In the form of its alkali metal salts it is a brown powder, which on being dyed on cotton and subjected to after-treatment with copper salts, yields an orange, fast to light and washing.

*Example 2.*—200 parts by weight of the disazodyestuff obtainable from one molecule of 4.4'-diaminodiphenyl-3.3'-dicarboxylic acid, one molecule of acetoacetic-o-anisidide and one molecule of m-aminophenylmethylpyrazolone are introduced at +5° C. into 2000 parts by weight of sulfuric acid monohydrate. When a test portion of the dyestuff has become soluble in aqueous sodium carbonate, the sulfonation mixture is poured into 10000 parts of ice water, and the dyestuff, which separates, is filtered. The dyestuff having in its free state the following formula:

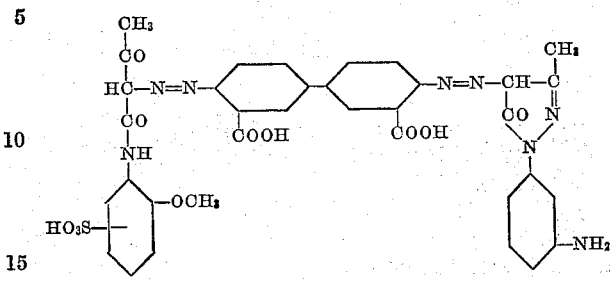

is stirred with sodium carbonate solution and dried. In the form of its alkali metal salts it is a brown powder, which on being dyed on cotton and subjected to after-treatment with copper salts, yields a brown, fast to light and washing.

I claim:

1. The process which comprises causing a sulfonating agent to act on an azodyestuff of the probable general formula:

$$R_1-N=N-x-N=N-R_1,$$

wherein $x$ represents a diphenyl-or diphenylurea dicarboxylic acid radical, in which the carboxylic acid groups stand in o-position to the azo-bridges, one $R_1$ represents the radical of an acetoacetic arylamide and the other $R_1$ represents a pyrazolone radical, until a test portion is soluble in aqueous alkalies.

2. The process which comprises causing a sulfonating agent to act on an azodyestuff of the probable general formula:

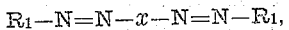

wherein one $R_1$ represents the radical of an acetoacetic arylamide and the other $R_1$ represents a pyrazolone radical, until a test portion is soluble in aqueous alkalies.

3. The process which comprises causing a sulfonating agent to act on an azodyestuff of the probable general formula:

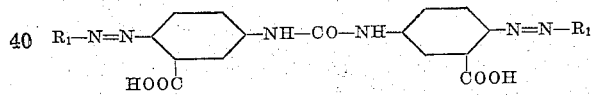

wherein "aryl" stands for a radical of the benzene series and $R_1$ stands for a pyrazolone radical, until a test portion is soluble in aqueous alkalies.

4. The process which comprises causing sulfuric acid monohydrate to act on the dyestuff of the following formula:

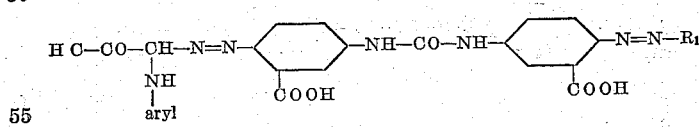

until a test portion is soluble in sodium carbonate solution.

5. The process which comprises causing a sulfonating agent to act on an azodyestuff of the probable general formula:

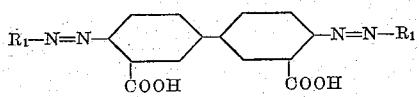

wherein one $R_1$ represents the radical of an acetoacetic arylamide and the other $R_1$ represents a pyrazolone radical, until a test portion is soluble in aqueous alkalies.

6. The process which comprises causing sulfuric acid monohydrate to act on the azodyestuff of the following formula:

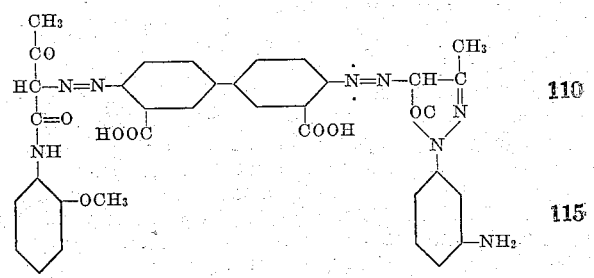

until a test portion is soluble in aqueous alkalies.

7. The compounds of the probable general formula:

$$(R_1-N=N-x-N=N-R_1)-SO_3H$$

wherein $x$ represents a diphenyl- or diphenylurea dicarboxylic acid radical, in which the carboxylic acid groups stand in o-position to the azo-bridges, one $R_1$ represents the radical of an acetoacetic arylamide and the other $R_1$ represents a pyrazolone radical, the sulfonic acid group probably standing in the aromatic nucleus of the acetoacetic arylamide radical, being in the form of

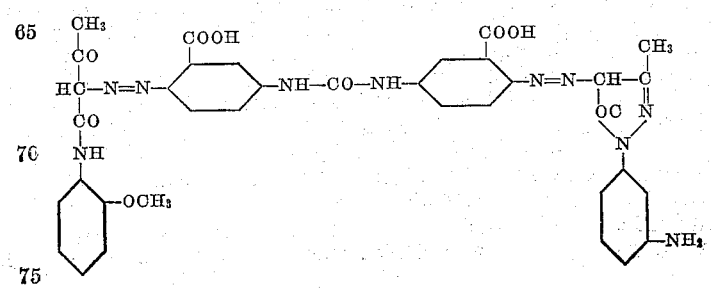

their alkali metal salts water soluble yellowish to brownish powders, dyeing the cellulosic fibre generally yellow to brown shades which, by the after-treatment with copper salts, yield full and clear dyeings of good fastness to light and washing.

8. The compounds of the probable general formula:

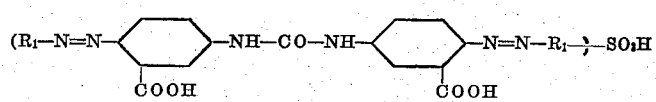

wherein one $R_1$ represents the radical of an acetoacetic arylamide and the other $R_1$ represents a pyrazolone radical, the sulfonic acid group probably standing in the aromatic nucleus of the acetoacetic arylamide radical, being in the form of their alkali metal salts water soluble yellowish to brownish powders, dyeing the cellulosic fibre generally yellow to brown shades which, by the after-treatment with copper salts, yield full and clear dyeings of good fastness to light and washing.

9. The compounds of the probable general formula:

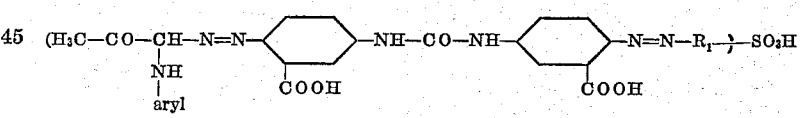

wherein "aryl" stands for a radical of the benzene series and $R_1$ stands for a pyrazolone radical, the sulfonic acid group probably standing in the aromatic nucleus of the acetoacetic arylamide radical, being in the form of their alkali metal salts water soluble yellowish to brownish powders, dyeing the cellulosic fibre generally yellow to brown shades which, by the after-treatment with copper salts, yield full and clear dyeings of good fastness to light and washing.

10. The compound of the following probable formula:

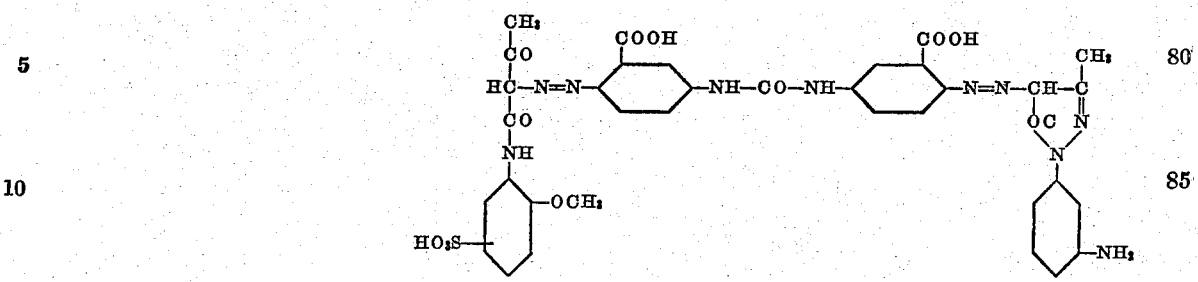

being in the form of its alkali metal salts a yellowish brown powder, dyeing the cellulosic fibre yellow shades which, by after-treatment with copper salts, yield an orange, fast to light and washing.

11. The compounds of the probable general formula:

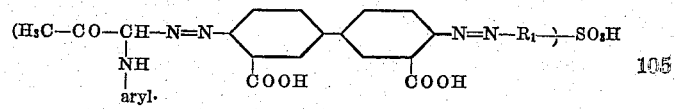

wherein "aryl" stands for a radical of the benzene series and $R_1$ stands for a pyrazolone radical, the sulfonic acid group probably standing in the aromatic nucleus of the acetoacetic arylamide radical, being in the form of their alkali metal salts water soluble yellowish to brownish powders, dyeing the cellulosic fibre generally yellow to brown shades which, by the after-treatment with copper salts, yield full and clear dyeings of good fastness to light and washing.

12. The compound of the following probable formula:

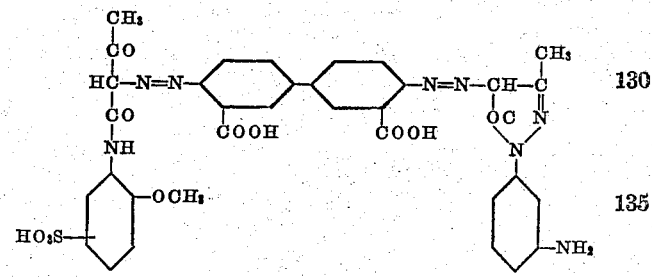

being in the form of its alkali metal salts a brown powder, dyeing the cellulosic fibre brown shades, which, by the after-treatment with copper salts, yield a brown fast to light and washing.

RUDOLF BAUER.